United States Patent [19]

Leutner et al.

[11] Patent Number: 4,830,842
[45] Date of Patent: May 16, 1989

[54] PREPARATION OF PURE BORON TRIFLUORIDE

[75] Inventors: Bernd Leutner, Frankenthal; Hans H. Reich, Ludwigshafen, both of Fed. Rep. of Germany

[73] Assignee: BASF Aktiengesellschaft, Ludwigshafen, Fed. Rep. of Germany

[21] Appl. No.: 152,912

[22] Filed: Feb. 5, 1988

[30] Foreign Application Priority Data

Feb. 19, 1987 [DE] Fed. Rep. of Germany ....... 3705283

[51] Int. Cl.$^4$ .......................... C01B 35/06; C01B 9/08
[52] U.S. Cl. ...................................... 423/293; 423/489
[58] Field of Search ................................ 423/293, 489

[56] References Cited

U.S. PATENT DOCUMENTS

| | | | |
|---|---|---|---|
| 2,109,340 | 2/1938 | Nieuwland et al. | 423/277 |
| 2,135,454 | 11/1938 | McAlevy | 423/293 |
| 2,148,514 | 2/1939 | Swinehart | 423/277 |
| 2,160,576 | 5/1939 | Loder | 423/293 |
| 2,196,907 | 4/1940 | Swinehart | 423/277 |
| 2,799,559 | 7/1957 | Sullivan et al. | 423/276 |
| 4,528,164 | 7/1985 | Cooper et al. | 423/293 |

FOREIGN PATENT DOCUMENTS

| | | | |
|---|---|---|---|
| 1159911 | 11/1961 | Fed. Rep. of Germany | 423/293 |
| 2307925 | 8/1974 | Fed. Rep. of Germany | 423/489 |
| 463545 | 3/1937 | United Kingdom . | |

*Primary Examiner*—Robert L. Stoll
*Assistant Examiner*—Adriana L. Eng
*Attorney, Agent, or Firm*—Keil & Weinkauf

[57] ABSTRACT

A multistage process for preparing pure $BF_3$ from hexafluorosilicic acid, $H_2SiF_6$, comprises reacting $H_2SiF_6$ with oxygen acids of boron and/or boron oxide in the first stage to give hydroxyfluoroboric acid and silica, filtering off the silica and concentrating the hydroxyfluoroboric acid, adding oleum to the concentrate and then heating to form gaseous $BF_3$.

4 Claims, No Drawings

PREPARATION OF PURE BORON TRIFLUORIDE

The present invention relates to a multistage process for preparing pure BF$_3$ from hexafluorosilicic acid and oxygen acids and/or oxides of boron.

It is known to prepare boron trifluoride from calcium fluoride by reacting boric acid or a salt thereof in anhydrous sulfuric acid. However, for this reaction it is necessary to employ relatively high temperatures of 180° C. or more, which entail substantial corrosion of the reactor material. It has to be regarded as a further disadvantage that the residue left behind is a concentrated sulfuric acid which contains the entire amount of starting calcium in the form of acid calcium sulfates. This calcium-contaminated sulfuric acid is very difficult to dispose of. It is true that this disposal problem would disappear if there was a further large-scale process where fluorosulfonic acid, HSO$_3$F, or a mixture of SO$_3$ and HF was made to react with B$_2$O$_3$. However, the disadvantage with this process is the use of 100% strength hydrofluoric acid, which represents an appreciable cost factor. In addition, to work with concentrated hydrofluoric acid, expensive safety precautions in respect of handling have to be taken. Hydrofluoric acid burns are very slow to heal.

A third method of preparing BF$_3$ is described in U.S. Pat. No. 2,148,514. This method comprises reacting solid Na$_2$O(BF$_3$)$_4$ with sulfuric acid to give gaseous BF$_3$, sodium hydrogensulfate and water-containing sulfuric acid. Instead of the sodium-containing compound it is also possible to use an ammonium-containing compound of similar composition, (NH$_4$)$_2$O(BF$_3$)$_4$. The abovementioned disadvantages, such as the use of concentrated hydrofluoric acid and the problems of disposing of sulfuric acid containing residues, are also common to this process.

U.S. Pat. No. 2,196,907 resorts to the same compound, (NH$_4$)$_2$O(BF$_3$)$_4$. According to this patent specification, this ammonium boron fluorine compound is prepared by reacting boric acid with ammonium hydrogenfluoride. However, this procedure is likewise complicated, since it is first necessary to prepare an additional intermediate in solid form. Also, the use of an ammonium borofluoride compound gives rise to sulfuric acid residues which, owing to the presence of ammonium ions, are technically complicated to dispose of. Passing the neutralized sulfuric acid into an outfall feeder or landfill dumping of gypsum derived from a neutralization with calcium hydroxide is frequently not possible on account of the ammonia, which is toxic to fish and a danger to groundwater.

According to GB patent No. 463,545 or U.S. Pat. No. 2,109,340, it is possible to prepare, from solid boron trioxide and 100% strength hydrofluoric acid, a compound of the composition H$_3$BO$_2$F$_2$, which is referred to therein as dihydroxydifluoroboric acid, HB(OH)$_2$F$_2$. Fro this compound and also from the adduct of this compound with BF$_3$ it is possible to isolate BF$_3$ by adding sulfuric acid (Examples 3 and 5). The disadvantage with this method of preparation is again the use of costly and hazardous anhydrous hydrofluoric acid.

U.S. Pat. No. 2,799,559 describes a process for preparing tetrafluoroboric acid by reacting hexafluorosilicic acid with boric acid at above 70° C., separating the precipitated silica from the reaction solution, and evaporating the reaction solution in two stages. However, this patent specification contains no mention whatsoever regarding the preparation of boron trifluoride.

De No. 2,320,360 describes a process for preparing potassium tetrafluoroborate wherein, again, hexafluorosilicic acid is reacted with solid boric acid in a molar ratio of from 11:1.8 to 1:1.25 by heating to 60°–100° C., the resulting silica is separated out of the reaction solution, and to the cold filtrate is added the amount of hydrofluoric acid stoichiometrically required for forming tetrafluoroboric acid. A potassium salt is then added to precipitate potassium tetrafluoroborate, which is filtered off and dried. This process likewise communicates no teaching concerning a preparation of boron trifluoride.

It is an object of the present invention to provide a process for preparing virtually pure boron trifluoride from inexpensive raw materials, which gives boron trifluoride in high yields and causes little by way of reactor material problems and in which the coupling products which arise by the very nature of the process do not present any disposal problems.

We have found that this object is achieved by reacting hexafluorosilicic acid with an oxygen acid and/or oxide of boron in a molar ratio of boron:H$_2$SiF$_6$ from 1.5 to 2.2, separating the precipitated silica from the reaction mixture, evaporating the reaction mixture to such an extent that the total amount of boron and fluorine is not less than 49% (m/m) and the hexafluorosilicic acid content, calculated as SiO$_2$, is not more than 0.25% (m/m), bringing the fluorine:boron atomic ratio in the resulting reaction mixture, if $>3.6$, to $\leqq 3.6$ by adding a further oxygen acid and/or oxide of boron, adding to the reaction mixture such an amount of oleum that not less than 80% of the water present therein is converted to sulfuric acid, and heating the reaction mixture with the oleum to above 80° C. to expel boron trifluoride.

In the first stage of the process according to the invention, namely the preparation of hydroxyfluoroboric acid from fluorosilicic acid and an oxygen acid of boron, e.g. HBO$_2$ or H$_3$BO$_3$ and/or a boron oxide, the starting materials used are free of or low in metal ions. If, for example, instead of boric acid a metal salt of boric acid, e.g. borax, Na$_2$B$_4$O$_7\times$10 H$_2$O or Colemanite, CaB$_3$O$_4$(OH)$_3\times$H$_2$O is used, it is true that the method described is likewise suitable for BF$_3$. However, it has been found that the yield of BF$_3$ decreases in the presence of metal ions and that to obtain a high BF$_3$ yield the temperature at which the BF$_3$ is expelled in the reaction of concentrated hydroxyfluoroboric acid and oleum has to be raised to about 160° C. or higher, which entails corrosion problems.

The fluorosilicic acid can be used in any desired concentration. However, to keep the amount of water to be distilled off in the evaporation stage and hence the energy consumption within proportion, it is advisable to use a very highly concentrated acid. A concentration from 20% to about 30% (m/m) of H$_2$SiF$_6$ has proven particularly advantageous.

The process can be carried out by introducing the hexafluorosilicic acid initially and adding the desired amount of oxygen acid of boron and/or boron trioxide. The reaction can be carried out at from 0° C. to the boiling point of the reaction mixture, which is from 100° to 105° C. To shorten the reaction time, it is advantageous to employ temperatures above 60° C. However, if a hexafluorosilicic acid having an $H_2SiF_6$ content of above 20% (m/m) is used, it is advantageous to introduce initially from about 20 to 70% of the total amount required and to add thereto all of the boron compound at below 60° C., preferably at from 15° to 30° C., then, if desired, to raise the mixture to temperatures from above 60° C. to the boiling point of the mixture under atmospheric pressure, and then to add the remainder of hexafluorosilicic acid. This procedure has the advantage of minimizing the amount of silicon tetrafluoride which volatilizes, thereby avoiding yield losses and problems in the subsequent cooling and cleaning of the off-gases.

After the reaction components have been mixed together, the reaction mixture should be stirred at from higher than 60° C., advantageously at about 90° C., to the boiling point for about 20 minutes or longer in order that substantial conversion of fluorosilicic acid may be obtained within an industrially acceptable time span. Thereafter the silicic acid, or silica, is separated from the mother liquor, which is advantageously done at elevated temperatures, and washed to remove adherent mother liquor. A counterflow wash is advantageous. The solid-liquid separation step can be carried out using any existing process and apparatus, for example filter presses, decanting and reciprocal pusher centrifuges, drum, belt or pan filters and the like. After washing, the solids content in the filter cake is usually about 20% (m/m); but it can also vary between about 15% and 35%. The washed $SiO_2$ filter cake is advantageously useable in the concentrating of phosphoric acid, which serves to improve the defluorination. It is equally possible to use it for the hydrothermal synthesis of silicates, such as sodium silicate and zeolites for example of the A, Y or ZSM type.

The mother liquor which has been separated off and which comprises a hydroxyfluoroboric acid having on average a composition of $HB(OH)_xF_{-x}$ where x ranges from about 0.2 to about 1 and a certain amount of fluorosilicic acid in equilibrium with the hydroxyfluoroboric acid is concentrated by evaporation in a third process stage. The $H_2SiF_6$ concentration decreases at the same time, which can be ascribed to gaseous $SiF_4$ being eliminated in parallel with the distillative removal of water. The process of concentrating should not be terminated until the total fluorine and boron concentration is not less than 49% (m/m) and the hexafluorosilicic acid content, calculated as $SiO_2$, is not more than 0.25% (m/m). This corresponds to $H_2SiF_6$ concentrations of not more than about 0.4% (m/m) of $H_2SiF_6$.

If the resulting reaction mixture has a fluorine:boron atomic ratio of >3.6 after the evaporation step, it is essential that said ratio be brought to values $\leq 3.6$, preferably 3-3.4, by adding an oxygen acid of boron and/or boron trioxide. If the atomic ratio is higher than that specified, the resulting boron trifluoride can be contaminated with hydrogen fluoride.

The reaction mixture is then treated with such an amount of oleum that not less than 80% of the water present therein is converted to sulfuric acid. The amount of water present can be calculated from the difference between the amount of hydroxyfluoroboric acid concentrate and the total amount of fluorine and boron present in the hydroxyfluoroboric acid concentrate by neglecting the small amount of hexafluorosilicic acid which may additionally be present. The amount of oleum is calculated on the basis of the reaction equation $$H_2O + SO_3 \rightarrow H_2SO_4$$

Using up to 20% less $SO_3$ than stoichiometrically required according to this equation has no appreciable effect on $BF_3$ yield and therefore is commercially advantageous. It is true that the shortfall from stoichiometric balance can be even greater, although the yield of $BF_3$ would be reduced as a result unless compensated by other measures, for example elevated reaction temperatures of more than 150° C. or by stripping with inert gases.

The reaction of hydroxyfluoroboric acid with oleum can be carried out batchwise or continuously. A continuous reaction regime has the advantages of uniform gas evolution, of better regulability, of smaller reactor size and of making it possible to reduce the consumption of thermal energy by employing a countercurrent heat exchanger.

The residual sulfuric acid obtained on reacting hydroxyfluoroboric acid with oleum contains only small amounts of fluoride and boron, so that it can be used directly and without further processing for producing nitrating acids or even fertilizers, specifically superphosphate or phosphoric acid.

In the Examples below, percentages are by mass, unless otherwise stated.

EXAMPLE 1

To 670 g of a fluorosilicic acid having an $H_2SiF_6$ content of 30.1% in a heatable vessel were added with stirring 247 g of boric acid, $H_3BO_3$, at 25° C. The mixture was heated to 98° C., and a further 447 g of fluorosilicic acid of the above concentration were added uniformly in the course of 20 minutes. The molar ratio of $B:H_2SiF_6$ was consequently 1.71:1. Following a delay time of 1 hour at 98° C., the precipitated $SiO_2$ was filtered off hot, and the filter cake was washed three times with 365 ml of hot water each time. The first filtrate and the wash liquors were combined.

1,622 g of the combined mother and wash liquors were reduced under atmospheric pressure in a polytetrafluoroethylene flask to 442 g, the starting temperature being 102° C. and the final temperature 158° C. The result was a hydroxyfluoroboric acid having an F content of 49.7% and a B content of 8.63%, which corresponds to an atomic ratio of 3.27 F:1 B, and an $SiO_2$ content of 0.03%.

100 g of the concentrated fluoroboric acid were introduced into a 1-l polytetrafluoroethylene flask. 280 g of oleum containing 65% of $SO_3$ (corresponding to a molar ratio of $H_2O:SO_3$ of 1:0.98) were added with care. On raising the temperature to 130° C. in the course of 80 minutes, 19.0 l of $BF_3$ evolved. This corresponds to a yield of about 87% based on starting boric acid and a fluorine yield of 75% calculated in a similar manner.

The $BF_3$ gas was found to be very pure, having an $SiF_4$ content of 0.06% (v/v).

EXAMPLE 2

Example 1 was repeated to react a total of 2.23 g of fluorosilicic acid (30.1% strength) with 0.495 kg of boric acid (corresponding to a molar ratio of boron:$H_2SiF_6$ of 1.72:1). A delay time of 2 hours at 98° C. was followed by hot removal of the precipitated silica by filtration and washing with 2.9 l of water.

Of the 3.7 kg of combined mother and wash liquor obtained, 3.46 kg were evaporated to 1.02 kg, the final bottom product temperature being 140° C. The result was a concentrated hydroxyfluoroboric acid having an F content of 42%, a B content of 7.4%, which corresponds to an atomic ratio of 3.22 F:1 B, and also an $SiO_2$ content of 0.04%.

To 0.1 kg of the concentrated hydroxyfluoroboric acid was added, gradually and at a uniform rate, 0.35 kg of 65% strength oleum (corresponding to a molar ratio of 1 $H_2O$:1.01 $SO_3$). After all the oleum had been added, which took about half an hour, the temperature was raised to 120° C. 16.4 l of gaseous boron trifluoride evolved. From this the total boron yield can be calculated at 93% and the total fluorine yield at 80%.

The $BF_3$ gas contained only 0.1% (v/v) of $SiF_4$.

EXAMPLE 3

Example 1 was followed in introducing initially 2,000 g of a 24% strength fluorosilicic acid, adding 348 g of boron oxide, $B_2O_3$, with stirring, and heating to 90° C. A further 1,750 g of 24% strength fluorosilicic acid were then added. The quantities of the reactants correspond to a molar ratio of 1.60 B:1 $H_2SiF_6$. After 3 hours of reaction, the $SiO_2$ was filtered off and washed. The combined filtrate and wash liquor was concentrated, by evaporation, to 46% of F and 7.6% of B (corresponding to an atomic ratio of 3.44 fluorine:1 boron). The concentrate had an $SiO_2$ content of 0.11%.

To 100 g of the concentrated hydroxyfluoroboric acid were added, at 120° C., 2.83 g of 65% strength oleum (corresponding to a molar ratio of 1 $H_2O$:0.89 $SO_3$). After the oleum had been added, the temperature was raised to 150° C. to drive off the last amounts of $BF_3$ gas. About 15 l of boron trifluoride gas having an $SiF_4$ content of only 0.3% (v/v) were obtained.

EXAMPLE 4

175 g of metaboric acid, $HBO_2$, were added at room temperature to 600 g of $H_2SiF_6$ (24% strength), and the temperature was raised to 95°–100° C. At 80° C. a start was made on adding a further 663 g of $H_2SiF_6$ (24% strength) in the course of one hour. After a further 0.5 hours of stirring at 95°–100° C., the precipitated silica was filtered off. From the starting weights the molar ratio of reactants can be calculated to be 1.90 B:1 $H_2SiF_6$.

The mother liquor was concentrated under reduced pressure (20 mmHg) to a fluorine content of 52.4% and a boron content of 9.6%, corresponding to an atomic ratio of 3.158 fluorine:1 boron. The concentrate contained <0.01% of $SiO_2$.

To 50 g of concentrated solution were added at 100° C. in the course of 15 minutes 120 g of oleum (65% strength) (corresponding to a molar ratio of 1 $H_2O$:0.90 $SO_3$), and the temperature was then raised to 140° C. 10 l of boron trifluoride were formed containing no detectable $SiF_4$ impurities. (The detection limit of this method of determination [IR spectroscopy] was below 0.04% (v/v).)

EXAMPLE 5

Example 3 was repeated, except for the sole difference that the reaction temperature for the reaction of fluorosilicic acid with boron oxide was reduced from 90° C. to 40° C. and in turn the reaction time was extended from 3 hours to 12 hours. This made no appreciable difference.

We claim:

1. A process for preparing substantially pure boron trifluoride, which comprises reacting hexafluorosilicic acid with an oxygen acid of boron and/or oxide of boron to form an aqueous reaction mixture having a molar ratio of boron:$H_2SiF_6$ of from 1.5 to 2.2, separating the precipitated silica from the reaction mixture, evaporating the reaction mixture to an extent that the total amount of boron and fluorine is not less than 49% (m/m) and the hexafluorosilicic acid content, calculated as $SiO_2$, is not more than 0.25% (m/m), bringing the fluorine:boron atomic ratio in the resulting reaction mixture, if >3.6, to ≦3.6 by adding a further amount of oxygen acid of boron and/or oxide of boron, adding to the reaction mixture an amount of oleum that not less than 80% of the water present therein is converted to sulfuric acid, and heating the reaction mixture with the oleum to a temperature from above 80° C. to 150° C. to expel boron trifluoride.

2. The process of claim 1, wherein the starting hexafluorosilicic acid has a concentration of more than 20% (m/m).

3. The process of claim 1, wherein the reaction of the hexafluorosilicic acid with the oxygen acid of boron and/or oxide of boron is carried out at a temperature from above 60° C. to the boiling point of the mixture.

4. The process of claim 1, wherein from 20 to 70% of the total amount of hexafluorosilicic acid required is reacted with the oxygen acid of boron and/or oxide of boron at from 15° to 30° C. and the remainder of hexafluorosilicic acid is then added at a temperature from above 60° C. to the boiling point of the mixture.

* * * * *